United States Patent
Nakata

(10) Patent No.: US 9,367,266 B2
(45) Date of Patent: Jun. 14, 2016

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Hiroaki Nakata, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/652,792

(22) Filed: Oct. 16, 2012

(65) Prior Publication Data

US 2013/0094045 A1 Apr. 18, 2013

(30) Foreign Application Priority Data

Oct. 18, 2011 (JP) .................................. 2011-229135

(51) Int. Cl.
*G06F 3/12* (2006.01)

(52) U.S. Cl.
CPC .............. *G06F 3/1204* (2013.01); *G06F 3/126* (2013.01); *G06F 3/1228* (2013.01); *G06F 3/1285* (2013.01)

(58) Field of Classification Search
None
See application file for complete search history.

(56) References Cited

U.S. PATENT DOCUMENTS

| 9,007,603 | B2 * | 4/2015 | Harmon | G06F 3/1204 |
| | | | | 358/1.13 |
| 2008/0074698 | A1 * | 3/2008 | Richter et al. | 358/1.15 |
| 2008/0130884 | A1 * | 6/2008 | Matsumoto et al. | 380/200 |
| 2011/0075207 | A1 * | 3/2011 | Nakata | 358/1.15 |

FOREIGN PATENT DOCUMENTS

JP 2011-76226 A 4/2011

* cited by examiner

*Primary Examiner* — John Wallace
(74) *Attorney, Agent, or Firm* — Canon USA, Inc. IP Division

(57) ABSTRACT

An information processing apparatus includes a first generation unit configured to generate a first print queue, and a second generation unit configured to generate a second print queue by operating a printer driver corresponding to the first print queue, wherein, after the second generation unit generates the second print queue, a printer list program for displaying printer information, which is printer-related information, displays the printer information about a printer corresponding to the first print queue and does not display the printer information about a printer corresponding to the second print queue.

12 Claims, 16 Drawing Sheets

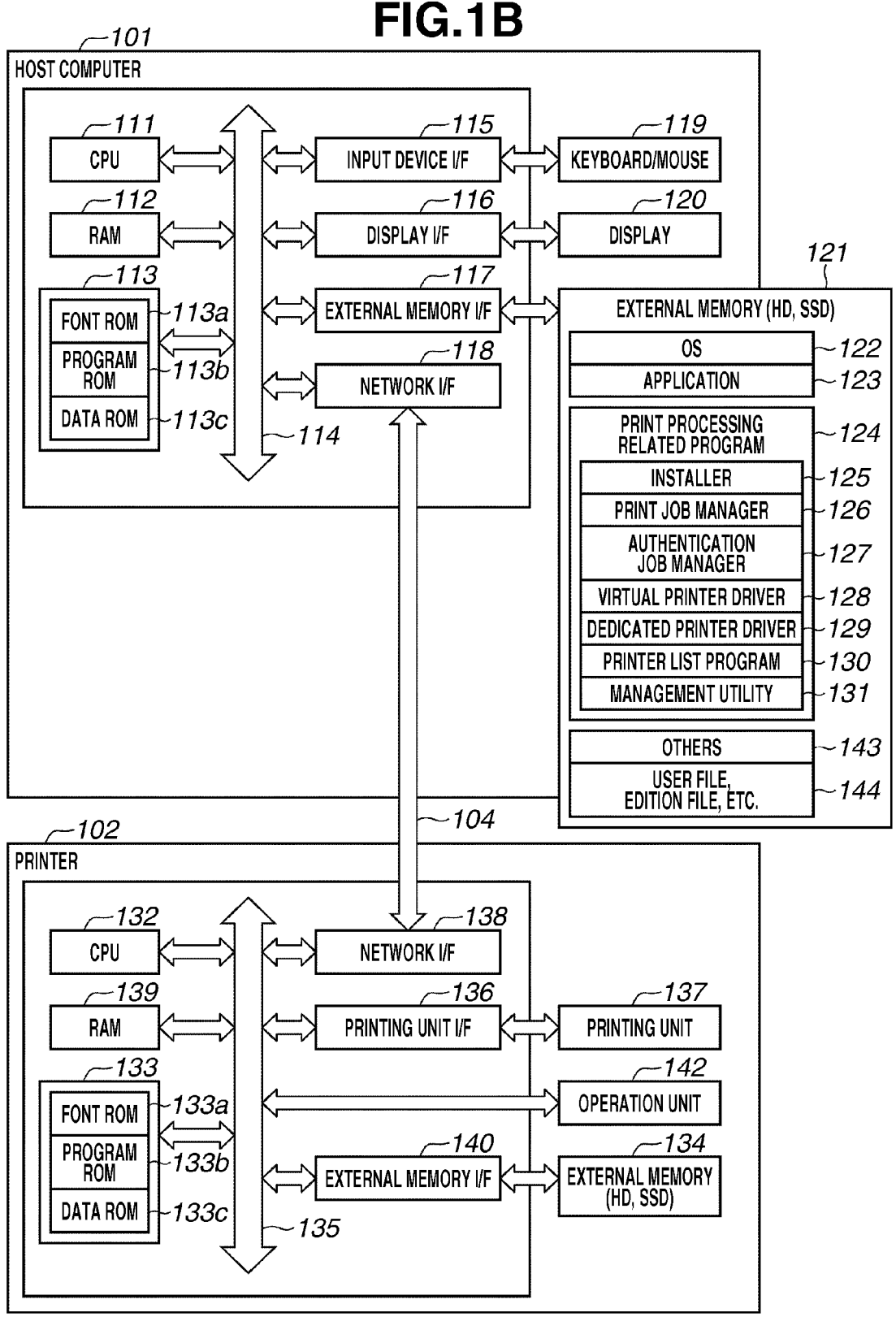

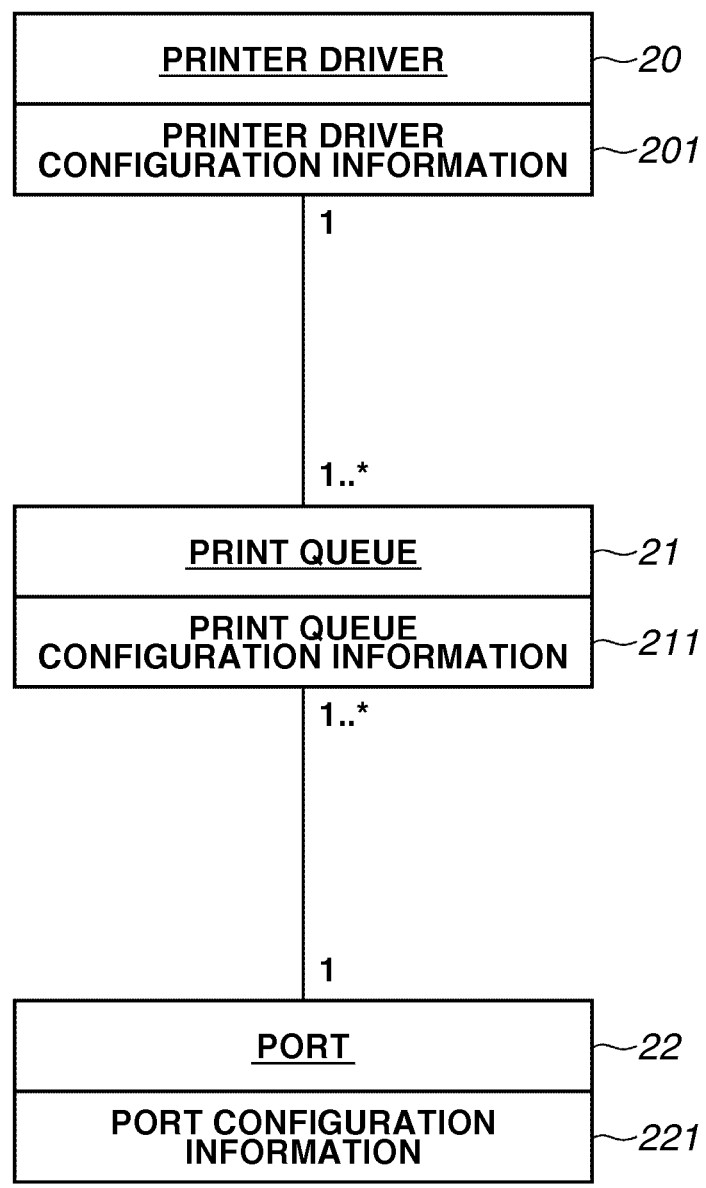

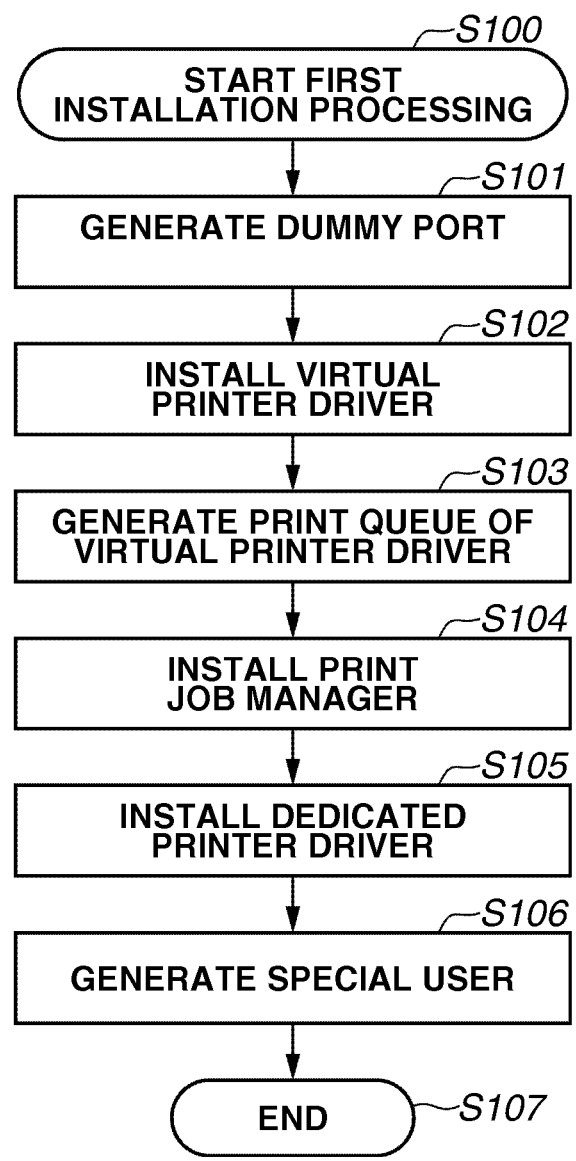

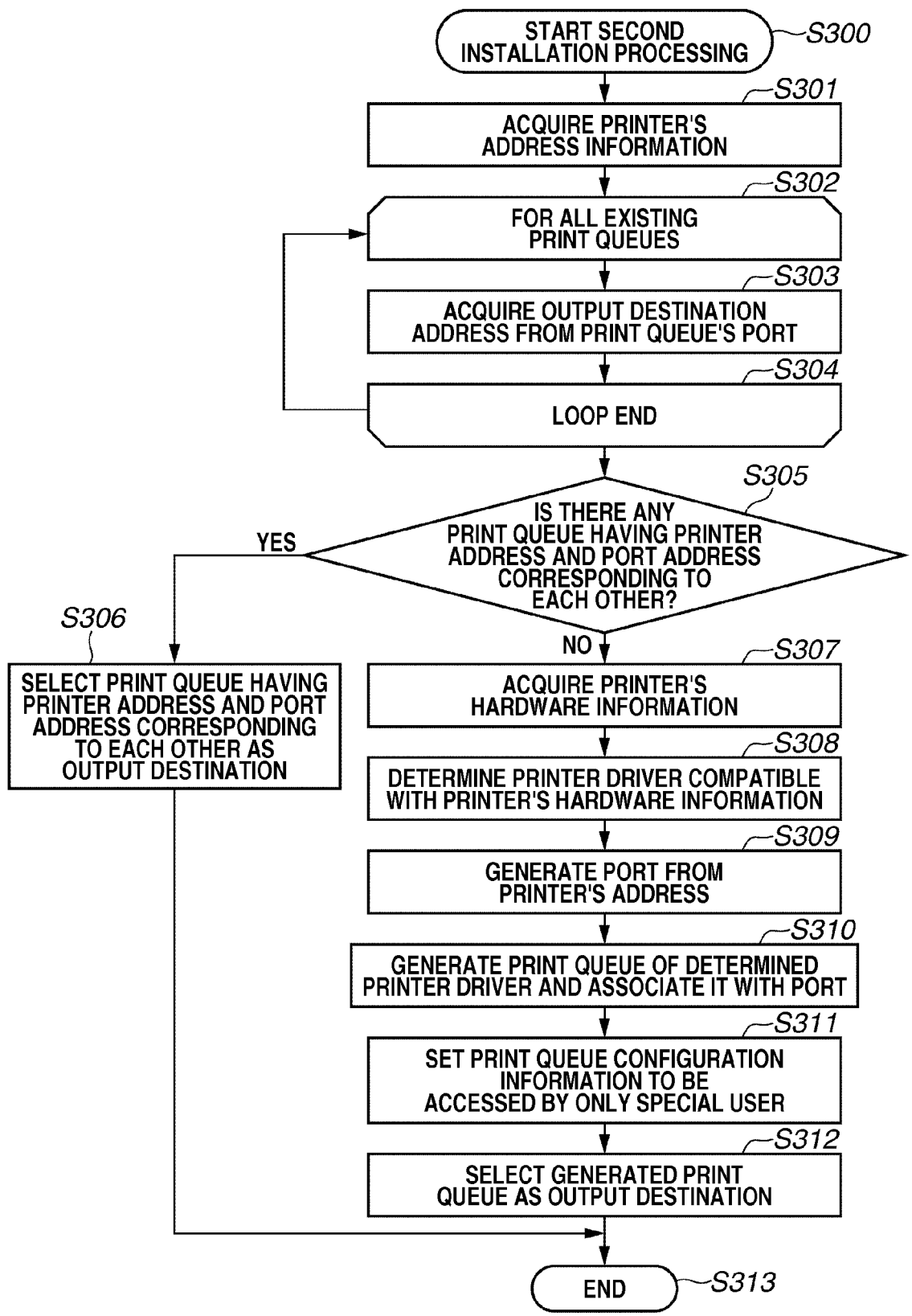

FIG.8A

| USER OBJECT |
|---|
| user01 |
| user02 |
| printuser |

FIG.8B

| GROUP OBJECT | USER OBJECT BELONGING TO |
|---|---|
| everyone | user01<br>user02<br>printuser |
| administrators | user01<br>printuser |

FIG.8C

| PRINT QUEUE | ACCESS RIGHT INFORMATION |
|---|---|
| Virtual Printer | everyone |
| Printer A | everyone |
| Created Printer B | printuser |

FIG.11A

| IC CARD'S ID | NETWORK ADDRESS OF HOST COMPUTER |
|---|---|
| 162696509400678657 | 192.168.0.2 |
| 149467185495277825 | 192.168.0.3 |
| . . . . | . . . . |

FIG.11B

| NETWORK ADDRESS OF AUTHENTICATION UNIT | NETWORK ADDRESS OF PRINTER |
|---|---|
| 192.168.0.16 | 192.168.0.48 |
| 192.168.0.17 | 192.168.0.49 |
| . . . . | . . . . |

INFORMATION PROCESSING APPARATUS, CONTROL METHOD, AND STORAGE MEDIUM

BACKGROUND OF THE INVENTION

1. Field of the Invention

One disclosed aspect of the embodiments relates to a technique for controlling display of printer information corresponding to a print queue.

2. Description of the Related Art

For using a printer via an information processing apparatus, generally, a specific printer driver compatible with the printer needs to be installed on the information processing apparatus.

When a plurality of printers to be used are provided, the same number of printer drivers as that of the printers are installed on the information processing apparatus. Thus, the user needs to perform many works for installing the printer driver, for example, acquiring an internet protocol (IP) address of the printer and looking for a compatible printer driver.

In recent years, techniques have been conceived for efficiently performing such works.

For example, Japanese Patent Application Laid-Open No. 2011-76226 discusses a technique for spooling a print document as intermediate data via a virtual printer driver and automatically installing a specific printer driver compatible with an output printer, to print the intermediate data via the specific printer driver.

SUMMARY OF THE INVENTION

According to an aspect of the embodiments, an information processing apparatus includes a first generation unit configured to generate a first print queue, and a second generation unit configured to generate a second print queue by operating a printer driver corresponding to the first print queue, wherein, after the second generation unit generates the second print queue, a printer list program for displaying printer information, which is printer-related information, displays the printer information about a printer corresponding to the first print queue and does not display the printer information about a printer corresponding to the second print queue.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIGS. 1A and 1B are block diagrams respectively illustrating a configuration of a network system and an internal apparatus configuration of a host computer and a printer according to a first exemplary embodiment.

FIG. 2 illustrates information about a printer driver, a print queue, and a port, and a relationship among them.

FIG. 3 is a flowchart illustrating first installation processing according to the first exemplary embodiment.

FIG. 7 is a flowchart illustrating second installation processing according to the first exemplary embodiment.

FIGS. 8A, 8B, and 8C illustrate examples of configuration information about users, groups, and print queues, respectively, according to the first exemplary embodiment.

FIGS. 11A and 11B illustrate examples of combination information stored by the authentication unit according to the second exemplary embodiment.

DESCRIPTION OF THE EMBODIMENTS

Various exemplary embodiments, features, and aspects of the disclosure will be described in detail below with reference to the drawings.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

A technique discussed in Japanese Patent Application Laid-Open No. 2011-76226 automatically generates a print queue corresponding to a specific printer driver, each time printing is performed using a printer with no specific printer driver installed.

If the same number of print queues are generated as that of the printers performing printing, the number of options of output destinations including a user-selectable printer is increased. Therefore, when the user selects the output destination, the user may not easily understand which output destination is to be selected, thereby reducing an operational efficiency.

For example, using a mobile information processing apparatus to which the technique discussed in Japanese Patent Application Laid-Open No. 2011-76226 is applied, the user moves carrying the information processing apparatus to change the printer for performing printing, so that the printer may perform printing. In this case, the number of print queues automatically generated is increased each time a new printer performs printing, thereby causing the problem described above.

Figure 1A:
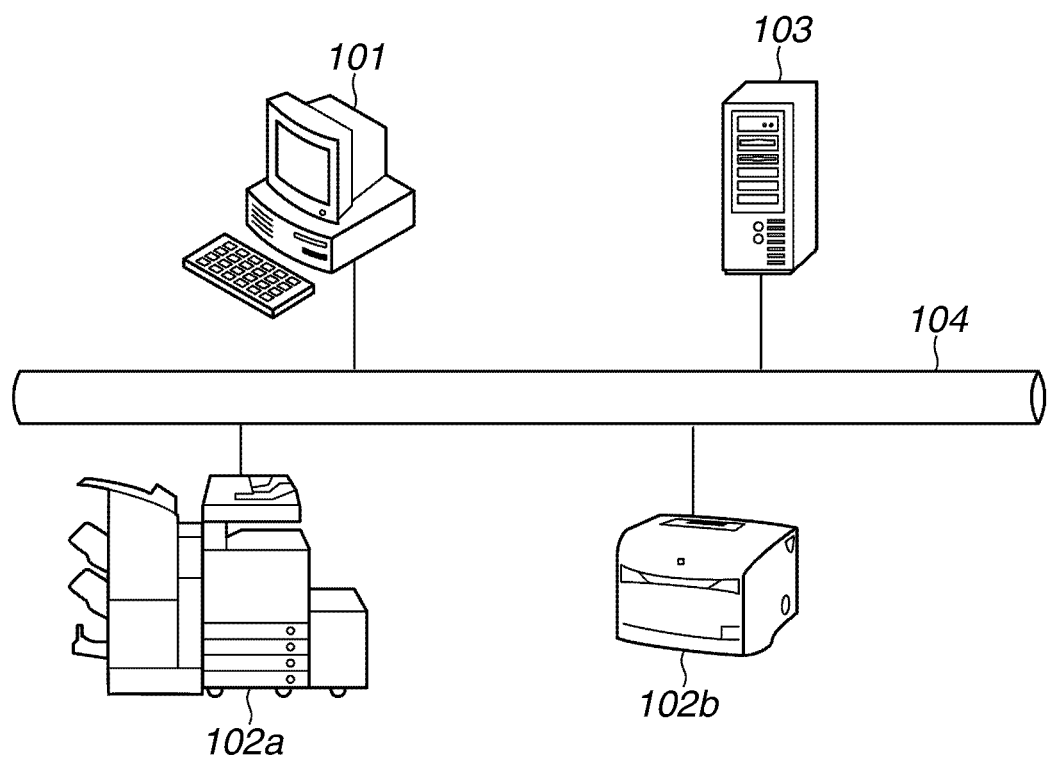

FIG. 1A is a block diagram illustrating an outline of a network system according to a first exemplary embodiment.

This network includes a host computer 101 and peripheral devices such as a plurality of printer 102a and 102b that receive print data from the host computer 101 to perform printing, which are connected with each other via a network 104.

FIG. 1B is a block diagram illustrating apparatus configurations of the host computer 101 and the printer 102 illustrated in FIG. 1A.

The host computer 101 is an information processing apparatus including a general personal computer.

A central processing unit (CPU) 111 comprehensively controls devices connected to a system bus 114 according to a program stored in a random access memory (RAM) 112.

The RAM 112 also functions as a main memory and a work area for the CPU 111.

A read only memory (ROM) 113 stores various types of programs and data. More specifically, the ROM 113 stores a font ROM 113a storing various types of fonts, a program ROM 113b storing a boot program and a basic input/output system (BIOS), and a data ROM 113c that segments and stores various types of data.

A keyboard controller interface (I/F) 115 controls a key input via a keyboard/pointing device (mouse) 119.

A display I/F 116 controls display on a display 120.

An external memory I/F 117 controls access with an external memory 121 such as a hard disk (HDD) and a solid state drive (SSD).

The external memory 121 includes an operating system program (hereafter, referred to as an "OS") 122, various types of printing applications 123, and a print processing related program 124. Further, the external memory 121 functions as a computer-readable storage medium storing a user file and an edition file 144.

As the OS 122, Microsoft (registered trademark) Windows (registered trademark) is used herein.

Additionally, when the CPU 111 executes processing based on the program stored in the external memory 121, the software configuration of the host computer 101 illustrated in FIG. 1B and the processing of each operation of the flowcharts described below may be realized.

The print processing related program 124 includes an installer 125, a print job manager 126, and an authentication job manager 127. Further, the print processing related program 124 includes a virtual printer driver 128, a specific printer driver 129, a printer list program 130, and a management utility 131.

The virtual printer driver 128 is a program used to perform printing not directly but indirectly on the printer 102.

The program is referred to as a "virtual program" since it is indirectly used for the printer 102. However, the virtual printer driver 128 is registered as a general printer driver with the OS 122. Thus, the user may perform printing in an almost normal printing operation process.

On the other hand, the specific printer driver 129 is a conventional printer driver used to directly perform printing.

As the specific printer driver 129, a printer driver that makes most of the function which each model of the printers 102a and 102b has may be prepared for each printer, or a printer driver of a general type that may be used only for a common function between the printers 102a and 102b may be prepared.

The network I/F 118 is connected to the printer 102 via the network 104 to perform communication control processing between the printer 102 and the network 104.

A configuration of the printer 102 will be described below.

The CPU 132 controls an entire operation of the printer 102.

The RAM 139 functions as the main memory and the work area for the CPU 132, and is also used as an output information development region and an environment data storage region.

Further, the RAM 139 also includes a non-volatile RAM (NVRAM) region and a memory capacity may be expanded with an option RAM to be connected to an additional portion.

The ROM 133 includes a font ROM 133a storing various types of fonts, a program ROM 133b storing a control program to be executed by the CPU 132, and a data ROM 133c storing various types of data.

A network I/F 138 transmits/receives data to/from the host computer 101. A printing unit I/F 136 controls an interface with a printing unit 137, which is a printer engine.

An external memory I/F 140 controls access from an external memory 134. The external memory 134 includes the HD and the SSD that are optionally connected to the printer 102, and stores font data, an emulation program, and form data.

When the external memory 134 such as the HDD is not connected, the ROM 133c of the ROM 133 stores information to be used by the host computer 101.

One or more external memories 134 may be provided. For example, a plurality of external memories may be connected that stores an option font card in addition to a built-in font and a program interpreting printer control languages having different language systems.

An operation unit 142 includes an operation panel receiving user's operations, on which switches and a light emitting diode (LED) display device for performing the operations are disposed.

Further, the NVRAM may store printer mode setting information transmitted via the operation panel.

Based on the control program stored in the program ROM 133b of the ROM 133, the CPU 132 outputs an image signal as output information to the printing unit 137 via the printing unit I/F 136.

Further, the CPU 132 may perform communication processing with the host computer 101 via the network I/F 138. Furthermore, the CPU 132 receives the print data transmitted from the host computer 101, and also notifies the host computer 101 of the information stored in the printer 102.

FIG. 2 illustrates each information about the printer driver, the print queue, and the port and a relationship among them.

FIG. 2 is an object diagram illustrating a unified modeling language (UML).

The OS 122 manages three types of objects, which are a printer driver 20, a print queue 21, and a port 22, so that the user may easily install the printer driver and print a document.

The OS 122 manages the objects to be stored in the external memory 121 as information and to be accessed via the program such as the application 123.

The printer driver 20 refers to the object, which is the installed virtual printer driver 128 or the installed specific printer driver 129.

Since the printer driver 20 is managed for each model, when the printer driver 20 has a different model, the printer driver 20 becomes a different object.

The print queue 21 is a print target object when printing is performed from the application 123. Further, the print queue 21 is managed with the printer driver 20 associated. A plurality of print queues 21 may be associated with one printer driver 20.

The port 22 is an object for specifying the output destination.

Generally, one port 22 is associated with one print queue 21 to be managed.

For example, when three printers of Device Model A are introduced at an office, the specific printer driver 129 compatible with the Device Model A is installed. It is typical configuration to associate one installed printer driver 20, three generated print queues 21, and three generated ports 22 with one another.

Each above-described object holds printer driver configuration information 201, print queue configuration information 211, and port configuration information 221 respectively.

The printer driver configuration information 201 includes a model name, a driver version, hardware information, and a driver module name.

The print queue configuration information 211 includes a print queue name, a printer driver name, a port name, print setting information, and access right information.

The port configuration information 221 includes a port name, address information such as information processing (IP) address, and a port module name.

FIG. 3 is a flowchart illustrating installation processing according to the present exemplary embodiment performed by the installer 125.

The user performs preparation for using a print system according to the present exemplary embodiment. More specifically, the user performs processing for installing the virtual printer driver 128, the print job manager 126, and the specific printer driver 129 on the OS 122 of the host computer 101 to be used, using the installer 125, and performs related processing.

According to the present exemplary embodiment, operations S100 to S107 are referred to as first installation processing.

In operation S101, the installer 125 generates a dummy port, in operation S102, the installer 125 installs the virtual printer driver 128, and in operation S103, the installer 125 instructs the OS 122 to generate the print queue of the virtual printer driver 128 with the dummy port associated.

In this specification, to instruct the OS 122 to generate the print queue is referred to as "to generate the print queue".

The dummy port herein means a false port 22 that does not actually output the print data.

As described below, the virtual printer driver 128 outputs the intermediate data for printing that is generated by the virtual printer driver 128 to the print job manager 126, as its feature.

Therefore, although the virtual printer driver 128 does not perform output via the port, for the convenience of management of the OS 122, the print queue 21 needs to be associated with one or more ports. Thus, the virtual printer driver 128 is associated with the dummy port that does not perform the output anywhere.

In operation S104, the installer 125 installs the print job manager 126.

Since the print job manager 126 and the virtual printer driver 128 may not be separated from each other, the installation of the print job manager 126 may be performed as the internal processing performed in operation S102.

In operation S105, the installer 125 installs the specific printer driver 129.

When the specific printer driver 129 is prepared for each model of the printers 102a and 102b, all the prepared specific printer drivers are installed.

The specific printer driver 129 is installed to generate the printer driver 20 on the OS 122.

The print queue 21 and the port 22 to be associated with the specific printer driver 129 are generated by the second installation processing described below.

In operation S106, finally, the installer 125 generates a special user on the OS 122.

The "special user" refers to a user object used to temporarily perform impersonation in the second installation processing and the print processing performed by the print job manager 126 described below.

According to the present exemplary embodiment, the user object of the special user is named as "printuser".

As described above, in operation S107, the first installation processing is ended.

Figure 4:
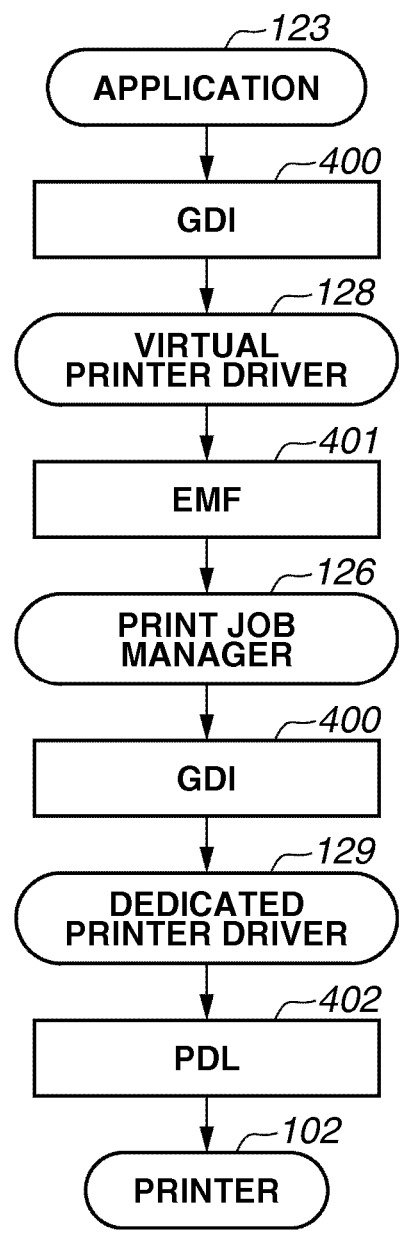
FIG. 4 illustrates a data flow of print processing according to the first exemplary embodiment.

FIG. 4 illustrates a data flow of the print processing according to the present exemplary embodiment.

With reference to FIG. 4, what type of input/output is performed among the print processing related programs will be described.

The application 123 outputs a print instruction order to the virtual printer driver 128 via a graphic device interface (GDI) 400, which is a drawing interface provided by the OS 122.

Subsequently, the virtual printer driver 128 converts the input print instruction order into an enhanced meta file (EMF) 401 format, and then outputs the converted print instruction order to the print job manager 126.

The EMF 401 herein has an intermediate data format compatible with the print instruction order of the GDI 400 output via the GDI 400 and may be acquired by recording a series of print instruction orders output from the application 123 as reproducible data.

The present exemplary embodiment will be described using the EMF 401 as the intermediate data format. However, as long as the print instruction order is reproducible, for example, XML Paper Specification (XPS), Portable Document Format (PDF), or a uniquely defined arbitrary format may be used.

The print job manager 126 performs the second installation processing described below, and outputs the print instruction order via the GDI 400.

The output print instruction order is input into the specific printer driver 129.

The specific printer driver 129 converts the input print instruction order into a page-description language (PDL) 402 format that may be processed by the printer 102, and then outputs the converted print instruction order to the printer 102 as a print job.

Finally, the printer 102 processes the input print job and performs print output.

Figure 5:
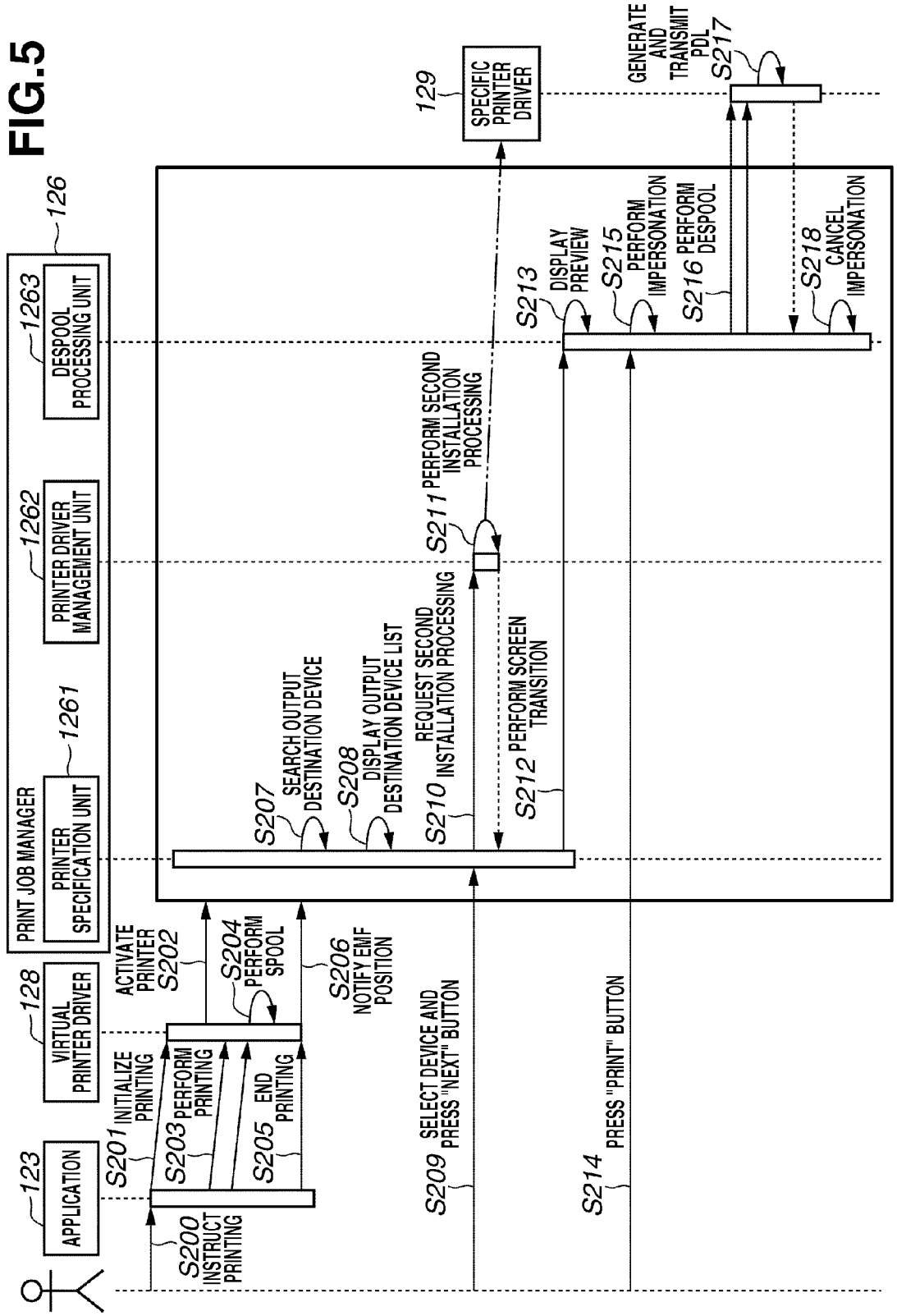
FIG. 5 illustrates a sequence of the print processing according to the first exemplary embodiment.

FIG. 5 is a sequence diagram illustrating the print processing according to the present exemplary embodiment.

With reference to FIG. 5, what type of processing is performed in and between components of the related programs while a series of print processing is performed will be described.

All the print processing is performed under a user's authority of "user01" described below.

Figure 6A:
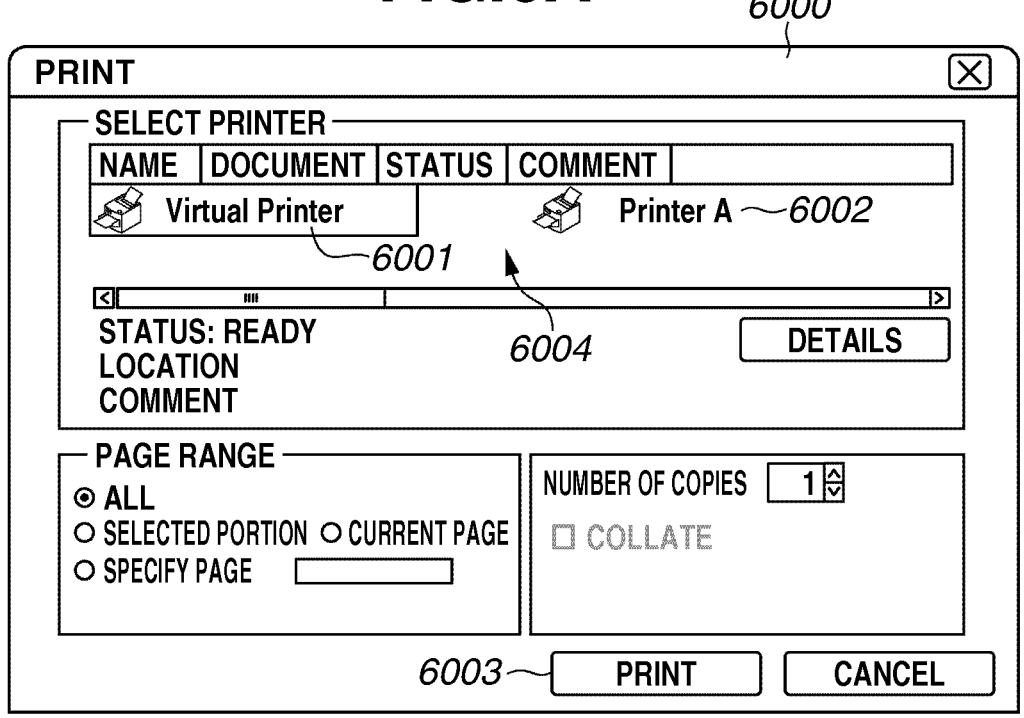
FIGS. 6A, 6B, and 6C illustrate examples of interfaces of an application and a print job manager according to the first exemplary embodiment.

First, in operation S200, the user inputs a print instruction of a document to be printed to the application 123 via a user interface (UI) 6000 illustrated in FIG. 6A.

The UI 6000 is displayed by the printer list program 130. The printer list program 130 functions as a display unit to realize the UI 6000.

Printer information 6001 and 6002 are displayed in a field 6004. In the field 6004, other output destinations that may be selected by the user are displayed. The output destination may include, for example, a PDF writer for generating the PDF.

In this specification, the printer information is also referred to as the print queue.

The print queue (printer information) 6001 is associated with the virtual printer driver 128, and a print queue 6002 is associated with the specific printer driver 129.

Since the print queue (printer information) 6002 of the specific printer driver 129 is not generated by the first installation processing, after the specific printer driver 129 is installed, the user generates the print queue 6002 by an operation different from the processing according to the present exemplary embodiment.

Since the output is performed via the virtual printer driver 128, the user selects the print queue 6001, and then presses a printing button 6003 to give an instruction for printing.

In operation S201, the application 123 performs print initialization processing on the virtual printer driver 128.

When the printing initialization is performed, then in operation S202, the virtual printer driver 128 performs activation processing on the print job manager 126.

The print job manager 126 is a program activated after the print processing is started on the virtual printer driver 128 as described above, and performs unique processing such as specification of the printer, the second installation processing, and printing execution on the specific printer driver 129 described below.

Further, the print job manager 126 includes a printer specification unit 1261, a printer driver management unit 1262, and a despool processing unit 1263 as internal components.

When the print job manager 126 is activated, in operation S203, the application 123 starts print processing on the virtual printer driver 128, and outputs a series of printing-drawing orders via the GDI 400.

In operation S240, the virtual printer driver 128 converts the input series of printing-drawing orders into the EMF 401 format, and then stores the converted printing-drawing orders in the external memory 121 so that the printing-drawing orders may be reproduced by processing in a latter phase.

The above-described processing is referred to as "spool processing".

In operation S205, the application 123 performs processing for ending printing at an end of the series of the printing-drawing orders, and in operation S206, the virtual printer driver 128 notifies the print job manager 126 of a file path of the stored EMF 401 in the external memory 121.

In operation S204, the spool processing is performed on the external memory 121. However, the spool processing may be directly performed on the print job manager 126 without via the external memory 121.

In operation S207, the printer specification unit 1261 searches the printer.

Searching herein refers to communicating with the printers 102a and 102b connected to the network 104 to acquire the information including their names, the installation locations, the IP addresses, and the hardware information.

The hardware information includes a printer's type and a vendor, which is a manufacturer.

As a communication method, Simple Network Management Protocol (SNMP) or a protocol of Web Services on Devices (WSD), which are known techniques, are used.

Since, normally, statuses of the printers 102a and 102b, in other words, whether the power is turned on and whether the printer is connected to the network 104, are not previously grasped, the printer specification unit 1261 attempts communication with all printers each time the print instruction is received.

A broadcast method, which is also a known technique, is used for the communication with all the apparatuses in the network.

When the printer specification unit 1261 transmits information acquisition data of the SNMP via the network I/F 118 by the broadcast method, all the printers 102 that may be reached via network 104 receive the information acquisition data. When each printer 102 transmits as response data the information about the name and installation location of the printer specified as an acquisition target via the network I/F 138, the printer specification unit 1261 sequentially receives the responses. The received information is stored in the RAM 112.

Figure 6B:
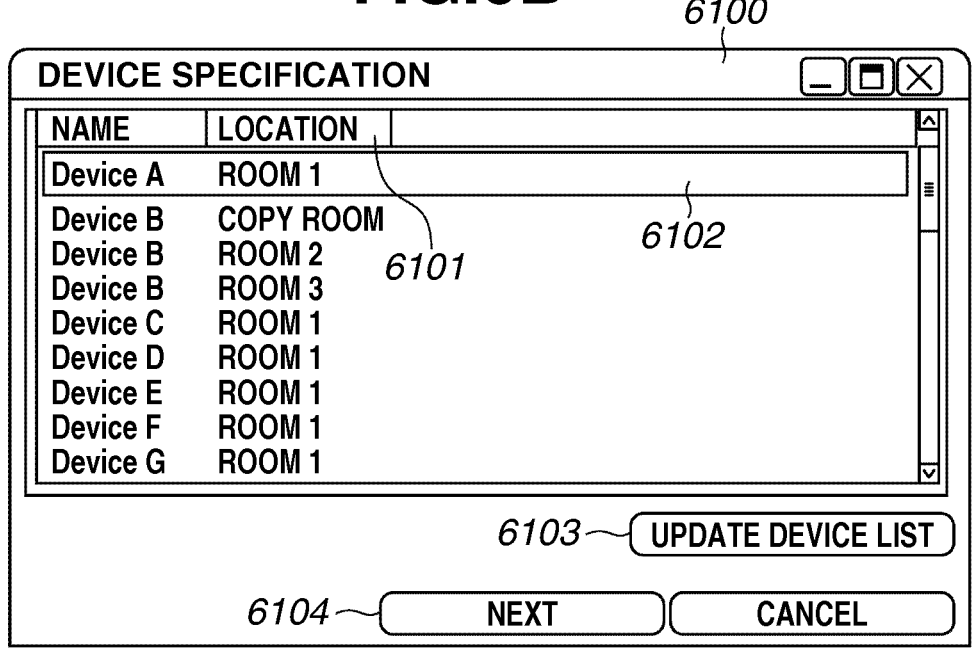

In operation S208, the printer specification unit 1261 acquires the information about the name and installation location of the printer from the received responses, and then the printer specification unit 1261 displays a printer list illustrated in FIG. 6B via the UI 6100.

A list control 6101 for displaying the information is displayed via the UI 6100, and one of the printers may be selected with a cursor 6102.

When a button 6103 is pressed, re-search is performed in the network 104 and the list of the printers that may be used may be updated to the newest state.

In operation S209, when a button 6104 is pressed, the printer currently selected with the cursor 6102 is determined as the output destination.

When the output destination is determined in operation S209, the printer specification unit 1261 causes the processing to proceed to a next step.

When the printer of the output destination is determined and the button for proceeding to the next is pressed in operation S209, then in operation S210, the printer specification unit 1261 requests the printer driver management unit 1262 to perform the second installation processing.

Description with reference to the sequence diagram illustrated in FIG. 5 is once stopped here, and details of the second installation processing will be described with reference to FIGS. 6A, 6B, 6C, and 7.

FIG. 7 is a flowchart illustrating the second installation processing.

If there is the print queue for requesting the printer selected by the user in operation S209 to perform printing, it is selected. If not, a new print queue is generated.

Further, when the print queue is newly generated, the special access right information is set to hide the new print queue, not to disturb a user's operation for selecting the print output destination.

In operation S300, the printer driver management unit 1262 starts the second installation processing, and then in operation S301, the printer driver management unit 1262 acquires the address information (e.g., IP address) of the printer 102.

The address information has been acquired by search processing of the printer performed in operation S207 and stored in the RAM 112.

Subsequently, in operations S302, S303, and S304, the printer driver management unit 1262 acquires the address information about the ports associated with the print queues from all the print queues registered with the OS 122.

In operations S302 to S304, the port associated with each print queue is specified based on the port information included in the print queue configuration information 211, and then the address information included in the port configuration information 221 about the specified port is acquired.

In operation S305, the printer driver management unit 1262 determines whether there is a print queue having the address information about the port that corresponds to the address information about the printer that becomes the output destination selected by the user in operation S209.

When there is the corresponding print queue (YES in operation S305), then in operation S306, the printer driver management unit 1262 selects the print queue as the target for requesting printing since the print queue does not need to be newly generated, and in operation S313, the second installation processing is ended. When there is no corresponding queue (NO in operation S305), then in operation S307, the printer driver management unit 1262 acquires the hardware information about the printer.

According to the present exemplary embodiment, as the hardware information, the hardware information to be used to install plug and play is acquired.

The hardware information has been acquired by the search processing of the printer performed in operation S207 and stored in the RAM 112.

In operation S308, the printer driver management unit 1262 determines the printer driver compatible with the hardware information about the printer that becomes the output destination from among the specific printer drivers 129 installed by the first installation processing.

In operation S308, the hardware information included in the printer driver configuration information 201 about each printer driver is acquired, and the acquired hardware information is compared with the hardware information about the printer, which becomes the output destination, and then the printer driver corresponding to the hardware information about the printer is selected.

The hardware information used for the present exemplary embodiment includes character string information for the plug and play. When the character strings of both pieces of hardware information correspond to each other, it means that the hardware information about the printer driver and the hardware information about the printer correspond to each other.

According to the present exemplary embodiment, in operation S105, the specific printer driver 129 compatible with all the printers 102a and 102b is previously installed into the OS 122 by the first installation processing.

When all printer drivers are not installed in operation S105, using the methods discussed in Japanese Patent Application Laid-Open No. 2011-76226, a general printer driver may be used or the compatible printer driver may be acquired from an external server.

In operation S309, the port for performing the output on the printer 102 is generated based on the address information, and in operation S310, the print queue of the printer driver determined in operation S308 is generated and associated with the port.

In operation S311, the access right information included in the print queue configuration information 211 about the generated print queue is set to allow only the special user to be accessed, in operation S312, the output destination is selected, and then in operation S313, the second installation processing is ended.

A method for setting the access right information in operation S311 may be a method for changing an initial value provided by the OS 122 or a method for originally setting the access right for allowing only the special user to access the print queue.

With reference to FIGS. 8A, 8B, 8C, and 9, processing will be described for setting the access right information about the print queue to allow only the special user to access the print queue in operation S311.

FIGS. 8A, 8B, and 8C illustrate examples of the user objects, group objects, and the access right information about the print queue on the OS 122.

FIG. 8A illustrates an example of user objects registered with the OS 122.

The example includes "user01", "user02", and "printuser" as the user objects.

Of the three user objects, the "printuser" is the special user object generated by the first installation processing.

The program on the OS 122 is always performed under the authority of any of the user objects.

According to the present exemplary embodiment, the application 123 is performed under the authority of the "user01", and the virtual printer driver 128 activated by the application 123 and further the print manager are also performed under the authority thereof.

FIG. 8B illustrates an example of the group objects registered with the OS 122.

The group objects are arranged in the same level as that of the user objects. The user object is associated with the group object so that the OS 122 may manage information about which user object belongs to which group object.

The group objects include "everyone" and "administrators".

The "everyone" is the group object to which all the user objects (user01, user02, and printuser) belong.

The "administrators" is the group object to which the user objects (user01 and printuser) having a manager authority belong.

FIG. 8C illustrates an example of a print queue registered with the OS 122.

"Virtual Printer" and "Printer A" are the print queues of the virtual printer driver 128 and the specific printer driver 129, which are indicated with the print queues 6001 and 6002 respectively illustrated in FIG. 6.

"Created Printer B" is a print queue generated by the second installation processing in operation S310.

Each print queue retains the print queue configuration information 211, and FIG. 8c illustrates the access right information, which is one type of information included in the print queue configuration information 211.

The access right information included in the print queue configuration information 211 refers to the information for determining whether to permit or refuse an operation for the print queue based on under which user authority the program is performed.

The access right information is indicated in the list of the user objects or the group objects.

For example, the "everyone" is set for the access information of the "Virtual Printer".

This means that, when the program is performed under the user's authority belonging to the "everyone" group object, the "Virtual Printer" is most likely to be accessed.

Since all the user objects belong to the "everyone" group object, the programs under all the user's authority may perform the print processing using the "Virtual Printer".

The next "Printer A" is the print queue generated under the authority of the "user01" separately from the processing according to the present exemplary embodiment. However, since the "everyone" group object is set for the "Printer A" as the access right information, all the user objects may be used.

The final "Created Printer B" is the print queue generated in operation S310 while the second installation processing is being performed. The printer driver management unit 1282 sets the "printuser" indicating the special user as the access right information.

In other words, if the print queue of the "Created Printer B" is generated in operation S310, the above-described processing performed in operation S311 sets the "printuser" for the access right of the "Created Printer B".

By the processing performed in operation S311, the OS 122 permits only the program performed under the authority of the "printuser" to access the Created Printer B", and refuses the programs of the user projects other than the above-described program (e.g., user01 also).

The printer list program 130 displaying the above-described UI 6000 is impacted by the setting of the access right information in operation S311. Subsequently, the specific processing of a printer list program 300 will be described herebelow.

The printer list program 130 may be incorporated into the OS 122, or a different program from the OS 122 operated thereon may be used.

Figure 9:
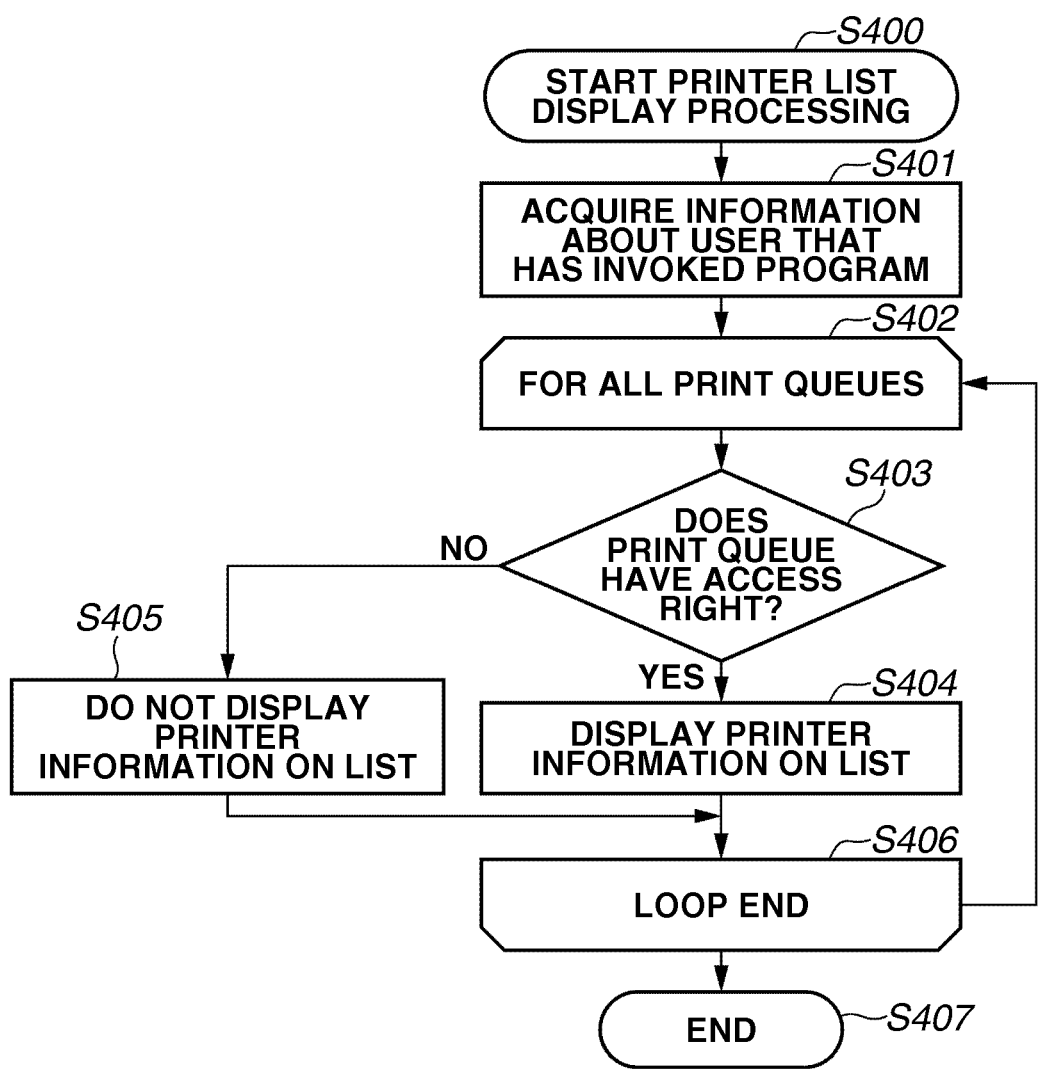
FIG. 9 is a flowchart illustrating printer list display processing according to the first exemplary embodiment.

FIG. 9 is a flowchart illustrating printer list display processing according to the present exemplary embodiment.

In the print processing performed in operation S200 according to the present exemplary embodiment, when the application 123 receives the printing instruction from the user to activate the printer list program 130.

When the printer list program 130 is activated, in operation S400, the printer list program 130 starts the printer list display processing for displaying the print queue of the printer via the UI 6000.

In operation S401, first, the printer list program 130 acquires the information about the user object that has invoked the program.

Since the print processing according to the present exemplary embodiment is performed under the authority of the "user01", the user object information acquired in operation S401 is the "user01".

In operations S402 to S406, the printer list program 130 repeatedly performs the processing on all the print queues registered with the OS 122.

The printer list program 130 acquires the access right information included in the print queue configuration information 211 about the print queue, and in operation S403, the printer list program 130 determines whether the user object acquired in operation S401 may access the print queue.

When the print queue has the access right (YES in operation S403), the processing proceeds to operation S404, in which the printer list program 130 displays on the list the printer information about the printer. When the print queue does not have the access right (NO in operation S403), then in operation S405, the printer list program 130 does not display the printer information on the list.

In operation S407, when the processing is repeatedly performed on all the print queues, the processing is ended.

As described above, when the print queue which only the special user may access is generated by the second installation processing, even though the print processing according to the present exemplary embodiment is performed again, the printer information corresponding to the generated print queue is not displayed via the UI 6000.

An "invisible print queue" is generated and registered with the OS 122. A state where the user has difficulty for selecting the output destination due to too many print queues may be avoided.

Referring back to FIG. 5, processing performed in operation S212 and subsequent processing thereof will be described. The essential point in the description of processing performed in operation S212 and subsequent processing thereof is how printing is instructed to the print queue to which only the special user may access.

Figure 6C:
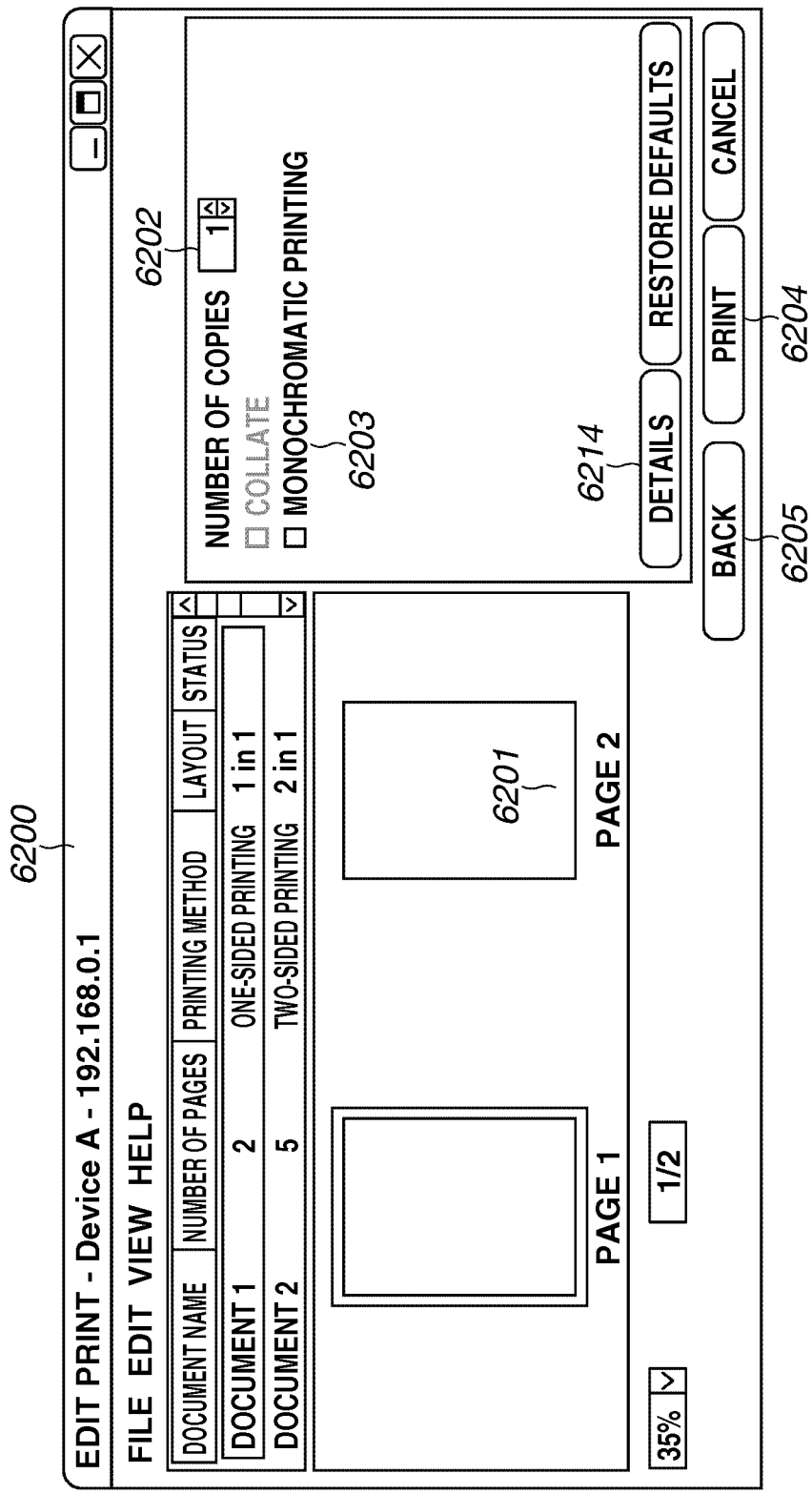

When the second installation is completed, then in operation S212, the printer specification unit 1261 shifts the UI 6100 of the printer list to the screen 6200 included in the despool processing unit 1263 illustrated in FIG. 6C.

When the UI 6100 shifts to the screen 6200, then in operation S213, the despool processing unit 1263 displays, in a preview area 6201, an image to be formed when a print document is actually printed.

The image displayed at this point may be acquired by the despool processing unit 1263 by reading the EMF 401 spooled in operation S204, analyzing the read EMF 401, and then drawing the image in a size corresponding to that of the preview area 6201.

When the despool processing unit 1263 receives the input via a button 6204 pressed by the user, then in operation S215, the despool processing unit 1263 performs impersonation. Subsequently, in operation S216, the despool processing unit 1263 performs the despool processing.

The impersonation is processing for changing the execution authority of the program from a temporary user object to another user object.

For example, to perform the impersonation processing for Microsoft (registered trademark) Windows (registered trademark), first, a user token is acquired via an application program interface (API) of "LoganUser", and the user token is specified via the API of "ImpersonateLoggedOnUser" to realize the impersonation.

According to the present exemplary embodiment, the impersonation is performed from the "user01" to the "printuser" to change the execution authority.

The subsequent despool processing performed in operation S216, which is the opposite processing of the spool processing performed in operation S204, reads the EMF 401 data from storage location information notified by the processing performed in operation S206, and then analyzes the read EMF 401 data to reproduce the printing-drawing orders.

The output destination of the reproduced printing-drawing order is the print queue of the output destination selected by the second installation processing.

When it is attempted to perform the despool processing in operation S216 without performing the impersonation in operation S215, and when the print queue that is the output destination is generated by the second installation processing, the OS 122 refuses the access under the authority of the "user01".

Therefore, the execution authority of the program needs to be temporarily changed to "printuser" by the impersonation in operation S215.

In operation S217, the specific printer driver 129 converts the input printing-drawing order into the PDL 402, and then transmits the converted printing-drawing order as a print job to the printer 102 via the network I/F 138.

When the despool processing in operation S216 and the PDL transmission processing performed by the specific printer driver 129 in operation S217 are ended, then in operation S218, the despool processing unit 1263 cancels the impersonation.

Canceling the impersonation refers to reverting a state where the execution authority of the program is impersonated to the original state, and it is realized via the API of "RevertToSelf" in Microsoft (registered trademark) Windows (registered trademark).

Finally, the print job manager 126 ends the program.

A spin control 6202 and a check box 6203 illustrated in FIG. 6C are input sections for changing general print settings such as the number of copies and monochromatic printing.

Further, a button 6214 is an input section for invoking a print setting UI (not illustrated) that is unique to the specific printer driver 129 and changing the unique print setting.

To perform such processing for changing the print setting, the print job manager 126 also needs to own the access right to the target print queue.

Therefore, when such printing setting processing is performed, the impersonation in operation S215 and cancelling the impersonation in operation S218 also need to be performed before and after them.

As described above, the technique is described for setting the access right information about the print queue so that only the special user may access the print queue to generate the "invisible print queue", and further performing the print processing on the "invisible" print queue.

Considering not to increase the number of the generated print queues, a simpler method is conceivable than the method for deleting the print queue itself after the print processing is ended.

However, if the method for deleting the print queue is adopted, the print queue needs to be generated in the second installation processing each time.

On the other hand, as with the present exemplary embodiment, if the print queue is not deleted, the print queue may be selected only as the output destination without generating the print queue (corresponding to operation S306).

Since the processing for generating the print queue is normally time-consuming, if the print queue is generated each time, the time when the user may not perform an operation becomes long from operation S209 to operation S212, thereby reducing efficiency.

Thus, to realize both of facilitating selection of the output destination and avoiding reduction of the efficiency in a user's operation, the method discussed in the present exemplary embodiment may be useful.

Subsequently, a second exemplary embodiment will be described.

The first exemplary embodiment is a system in which the user specifies the output destination on the host computer to instruct the printing.

On the other hand, the second exemplary embodiment is an authentication printing system, in which the user instructs only the printing via the host computer and an authentication unit such as a card reader provided near the printer performs authentication to specify the output destination.

Figure 10A:
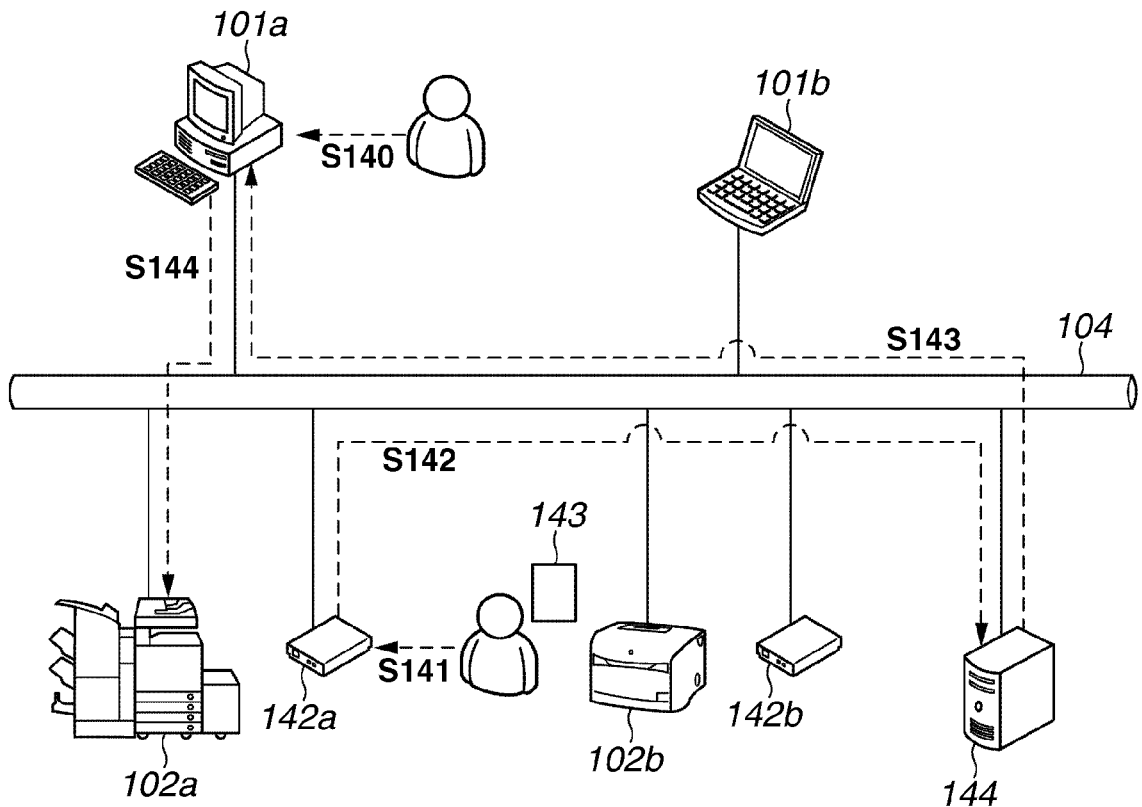
FIGS. 10A and 10B are a configuration diagram of a system and a block diagram illustrating an apparatus configuration of an authentication unit, respectively, according to a second exemplary embodiment.

FIG. 10A is a block diagram illustrating a schematic view of a network system according to the second exemplary embodiment.

As illustrated in FIG. 10A, the network system includes a plurality of host computers 101a and 101b, a plurality of printers 102a and 102b, a plurality of authentication units 142a and 142b, an integrated circuit (IC) card 143, and an authentication server 144, which are connected with one another via the network 104.

First, before the details of each device included in the system are described, an outline of the system will be described along a flow of a printing operation.

In operation S140, the host computer 101a receiving the printing instruction from the user performs the print processing without specifying the printer of the output target, and retains an input print job.

In operation S141, the authentication unit 142a receives a cue for selecting the output printer 102a when the user swipes the IC card. In operation S142, the authentication unit 142a reads identification (ID) that is unique to the IC card 143 therefrom, and transmits the ID to the authentication server 144.

In operation S143, the authentication server 144 transmits a network address of the printer 102a to the host computer 101a associated with the received ID.

In operation S144, the host computer 101a performs rendering on the retained print job and outputs it to the received network address of the printer 102a.

Details of each device included in the system illustrated in FIG. 10A will be sequentially described.

The authentication unit 142a is a terminal for specifying the output printer and performing authentication printing.

The authentication unit needs to be paired with the output printer. As illustrated in FIG. 10A, for example, the printer 102a is associated with the authentication unit 142a, and the printer 102b is associated with the authentication unit 142b.

The information of the printer and the authentication unit may be stored in the authentication unit to associate the printer with the authentication unit. However, according to the present exemplary embodiment, the association between the printer and the authentication unit is realized by the authentication server 144 described below.

Figure 10B:
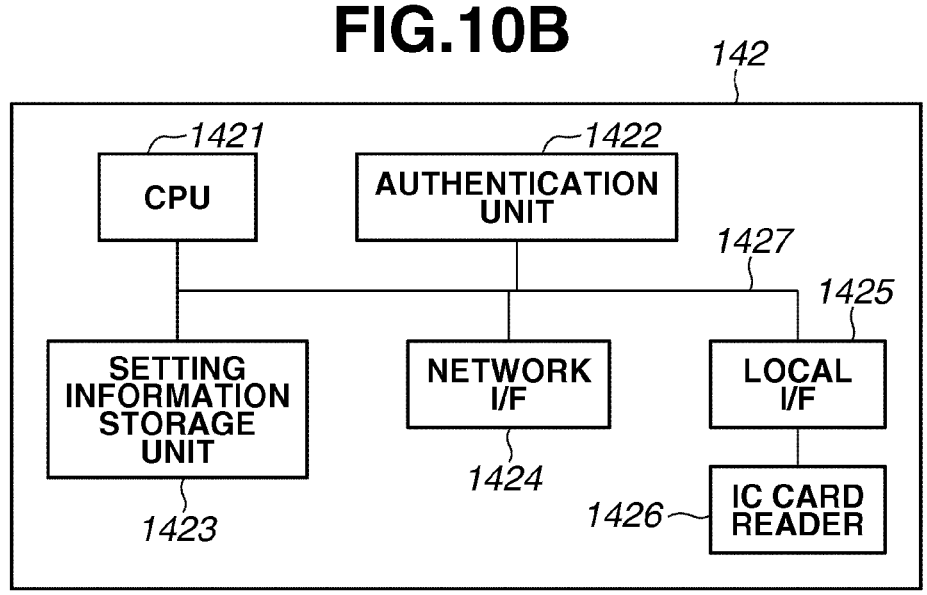

FIG. 10B is a block diagram illustrating an example of a schematic configuration of the authentication unit 142.

As illustrated in FIG. 10B, the authentication unit 142 includes a central processing unit 1421, an authentication unit 1422, a setting information storage unit 1423, a network I/F 1424, and a local I/F 1425.

The authentication unit 142 is configured by above-described function units connected with one another via a system bus 1427.

The IC card reader 1426 is connected to the local I/F 1425.

The CPU 1421 is a central processing unit controlling the entire authentication unit 142.

The authentication unit 1422 stores the network address of the authentication server 144 input when the initial setting is performed on the authentication unit 142.

The IC card reader 1426 reads unique identification information from the IC card.

The IC card reader 1426 is estimated to be a reading device corresponding to a non-contact type IC card such as Felica (registered trademark). However, the technique is not limited thereto. As long as the unique identification information may be input, other realization methods may be adopted.

For example, in place of the IC card reader, a biometric authentication sensor such as a fingerprint sensor may be adopted.

The IC card reader 1426 is not directly connected to the system bus 1427 but connected thereto via the local I/F 1425 so that the authentication unit may be flexibly changed.

The authentication unit 1422 transmits the ID acquired via the IC card reader 1426 to the authentication server 144 via the network I/F 1424.

The configuration of the printer 102 is as described with reference to FIG. 1B.

The authentication unit 142 is provided to specify the printer 102, and thus the authentication unit and the printer are generally disposed physically close to each other.

According to the present exemplary embodiment, the printer and the authentication unit are separately configured. However, the printer may include the function corresponding to the authentication unit.

The authentication server 144 stores information about a first combination between the ID of the IC card and the network address of the host computer illustrated in FIG. 11A.

Further, the authentication server 144 stores information about a second combination between the network address of the authentication unit and the network address of the output device illustrated in FIG. 11B.

The authentication server 144 unifies management of the information illustrated in FIG. 11A and the information illustrated in FIG. 11B, so that the authentication printing performed by associating the host computer, the printer, and the authentication unit with one another may be realized.

The authentication server 144 receives the ID of the IC card 143 from the authentication unit 142a. As a result, the network address (192.168.0.2) of the host computer 101a associated with the ID (162696509400678657) may be acquired from the information about the first combination illustrated in FIG. 11A.

Further, the authentication server 144 receives the network address (192.168.0.16) of the authentication unit 120a at the same time when receiving the ID. Therefore, the network address (192.168.0.48) of the printer 102a associated with the authentication unit 142a may be acquired from the information about the second combination illustrated in FIG. 11B.

Finally, the authentication server 144 transmits the network address (192.168.0.48) of the printer 102a acquired as described above to the host computer 101a, and then promotes to transmit the print job from the host computer 101a to the printer 102a.

The configuration of the host computer 101 is as described with reference to FIG. 1B.

According to the second exemplary embodiment, the authentication job manager 127 performs main processing, while, according to the first exemplary embodiment, the print job manager 126 performs a main role including the print processing and the installation processing.

Figure 12:
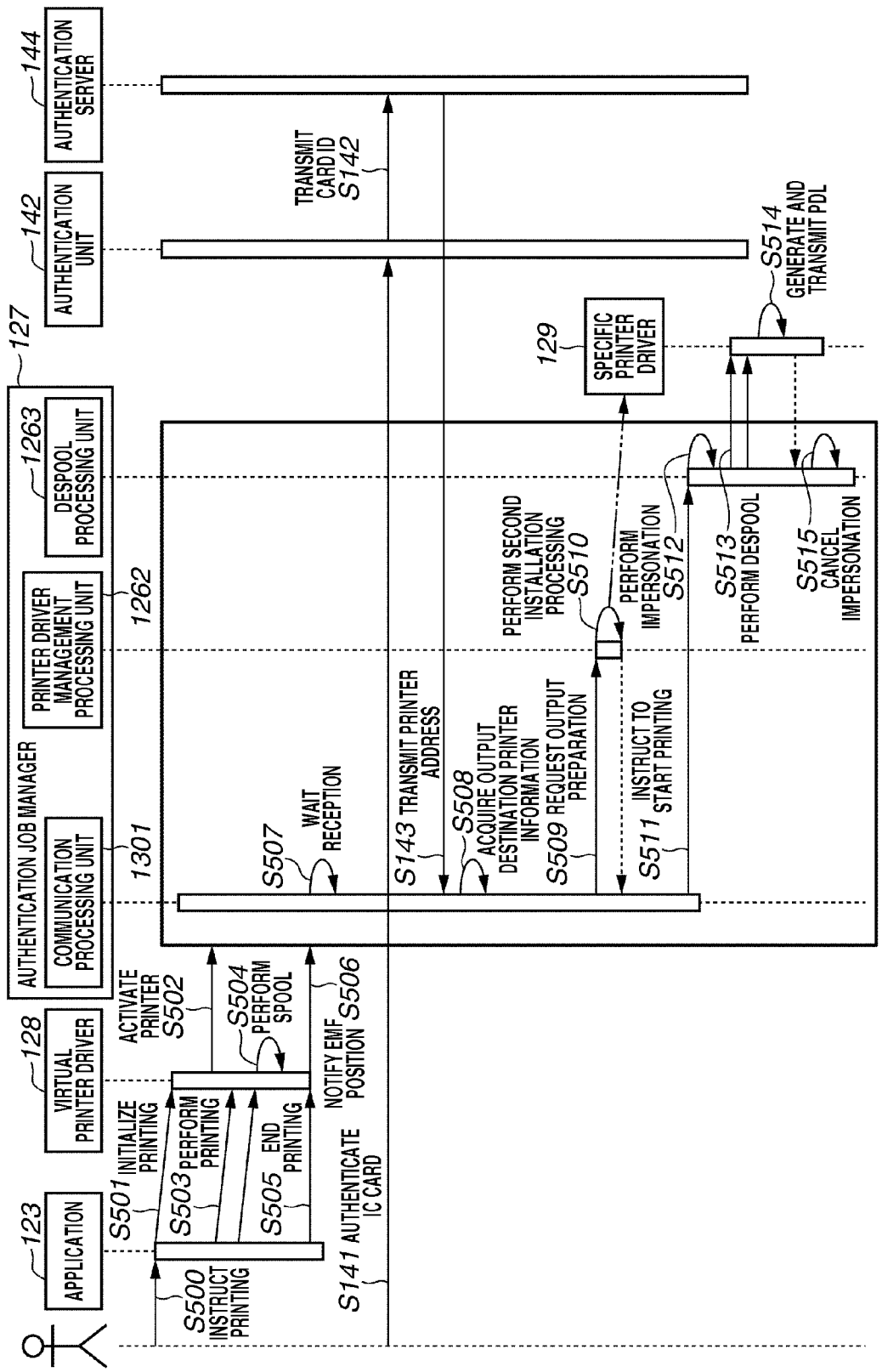
FIG. 12 is a sequence diagram illustrating print processing according to the second exemplary embodiment

Using the sequence diagram illustrated in FIG. 12, the print processing performed in operation S500 and subsequent processing thereof will be described that are performed with the print processing related programs whose main program is the authentication job manager 127 according to the second exemplary embodiment.

Prior to the print processing, similar setup to that of the first installation processing is performed by the host computer 101a. More specifically, instead of installing the print job manager 126 in operation S104, the authentication job manager 127 is installed.

Of the print processing according to the second exemplary embodiment, the print processing performed in operation S500 to operation S506 by the applications 123 and the virtual printer driver 128 is almost the same as the processing performed in operation S200 to operation S206 respectively described in the first exemplary embodiment.

Only one difference is that the authentication job manager 127 is activated in operation S502, while only the print job manager 126 is activated in operation S202.

The authentication job manager 127 includes three internal components, which are similar to those of the print job manager 126, and both the authentication job manager 127 and the print job manager 126 include the printer driver management unit 1262 and the despool processing unit 1263.

The rest one is the communication processing unit 1301, which is the internal component unique to the authentication job manager 127 and performs communication with the authentication unit 142 and controls the printer driver management unit 1262 and the despool processing unit 1263.

When the authentication job manager 127 is activated in operation S502, then in operation S507, the communication processing unit 1301 performs reception waiting processing.

The reception waiting processing controls the network I/F 118 of the host computer 101 to receive the information transmitted by the authentication server 144.

The network I/F 118 is controlled by a function of the API provided by the OS 122. The API includes Winsock, for example.

When a memory position of the EMF is notified in operation S506, then in operation S507, the reception waiting processing is performed so that the job is held on the host computer 101 and enters a waiting state until the user starts the authentication operation.

When the user operates the authentication using the IC card 143 in operation S141, then in operation S142, the authentication unit 142 reads the card ID and transmits the card ID information to the authentication server 144.

In operation S143, the authentication server 144 transmits the network address of the printer 102 of the output destination acquired based on the stored and combined information to the host computer 101.

Details of the processing performed in operation S141 to operation S143 are as described with reference to FIGS. 10A and 10B.

When the communication processing unit 1301 of the authentication job manager 127 receives the network address of the printer 102 of the output destination from the authentication server 144, and then in operation S508, the communication processing unit 1301 performs the output destination printer information acquisition processing.

The output destination printer information acquisition processing in operation S508 performs the same processing as the search processing in operation S207 of the printer on one printer 102.

In operation S207, the hardware information about the printer is acquired via a simple network management protocol (SNMP) by a communication method such as a broadcast communication method searching for the network nearby. In operation S508, the hardware information is acquired only from the printer 102.

A second installation processing request performed in operation S509 by the communication processing unit 1301 and the second installation processing performed in operation S510 by the printer driver management unit 1262 are the same as processing in operation S210 and operation S211 respectively described in the first exemplary embodiment.

In other words, the access right information about the print queue is set so that, when the print queue is generated by the second installation processing, only the special user may access the print queue.

When the second installation processing completes the installation of the specific printer driver in operation S510, then in operation S511, the communication processing unit 1301 gives a print start instruction to the despool processing unit 1263.

Processing operation S512 to operation S515 performed by the despool processing unit 1263 is the same as that of operation S215 to operation S218 respectively according to the first exemplary embodiment.

In other words, the series of processing including the impersonation in operation S512 for the special user, reproduction of the intermediated data as the drawing order by the despool processing in operation S513, the generation and transmission of the PDL data in operation S514, and the cancel of the impersonation in operation S515 are the same as those of the first exemplary embodiment.

As described above, also in the authentication print system according to the second exemplary embodiment, by generating the "invisible print queue", the problem may be solved in which, when the output destination is selected via the UI 6000, the selection is difficult due to too many output destinations.

A third exemplary embodiment will be described herebelow.

Figure 13:
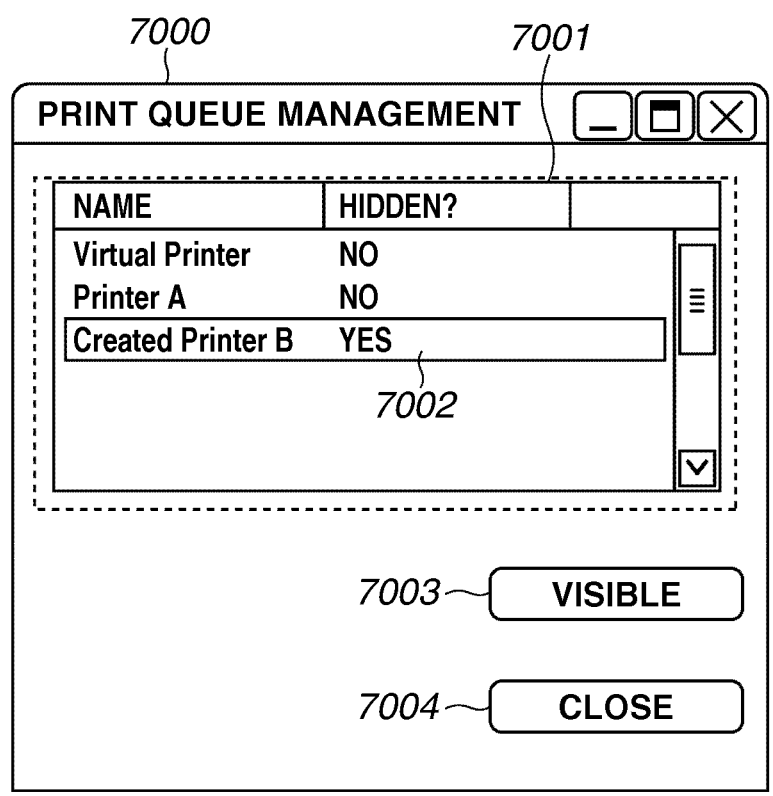
FIG. 13 illustrates an example of a user interface of a management utility according to a third exemplary embodiment.

FIG. 13 illustrates an example of a UI 7000 displayed by the management utility 131.

As described in the first and second exemplary embodiments, since the access right information of the print queue generated by the second installation processing is set so that only the special user may access, the UI 6000 is not displayed as the output destination.

By maintaining a state where the print queue is not displayed, the operation of selecting the output destination via the UI 6000 becomes easier. On the other hand, when the printer 102 is frequently used, it may be more convenient if the corresponding print queue is displayed via the UI 6000.

Thus, the management utility 131 provides a method to make visible the invisible print queue generated by the second installation processing.

The management utility 131 is the management program that is installed into the host computer 101 with the virtual printer driver 128 by the first installation processing and activated in response to an arbitrary activation request from the user.

Figure 14A:
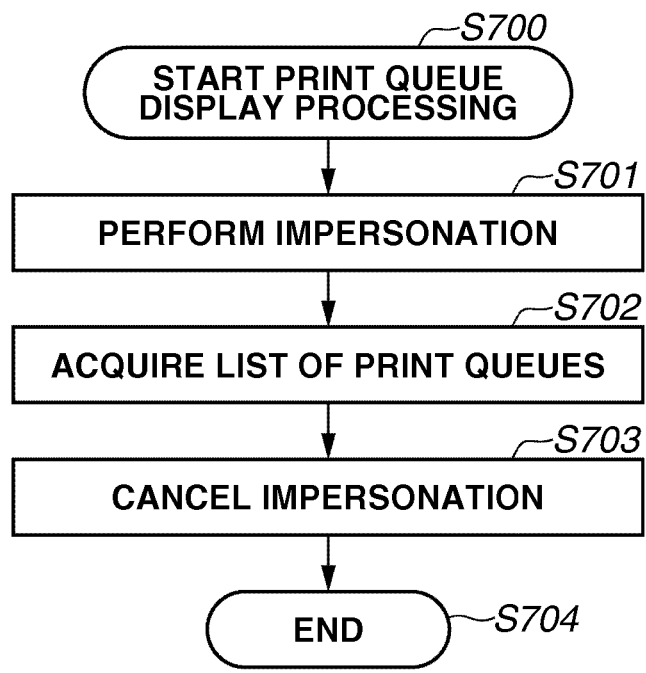
FIGS. 14A and 14B are flowcharts of the management utilities according to the third exemplary embodiment.

Upon activation of the management utility 131, the print queue display processing in operations S700 to S704 illustrated in a flowchart in FIG. 14A is started.

In operation S701, the management utility 131 performs the impersonation on the special user to acquire a list of the print queues including the print queue which only the special user may access.

Subsequently, in operation S702, the management utility 131 acquires the list of the print queues.

The information acquired by the management utility 131 in operation S702 includes the name of the print queue, the special user's access right, and the access right of the user object such as "user01" except for the special user.

Finally, the management utility 131 cancels the impersonation in operation S703, and ends the processing in operation S704.

When the processing illustrated in FIG. 14A is ended, a list 7001 displays the list of the print queues with name information and information about whether the print queue is hidden.

Whether the print queue is hidden means whether only the special user may access the print queue.

When the print queue is added by the second installation processing, "YES" is displayed, and when it is not, "NO" is displayed.

An operation for managing the print queue may be performed by pressing a button 7003 with the print queue selected with a cursor 7002.

When the selected print queue is hidden, and only when "YES", the button 7003 may be pressed for input.

Figure 14B:
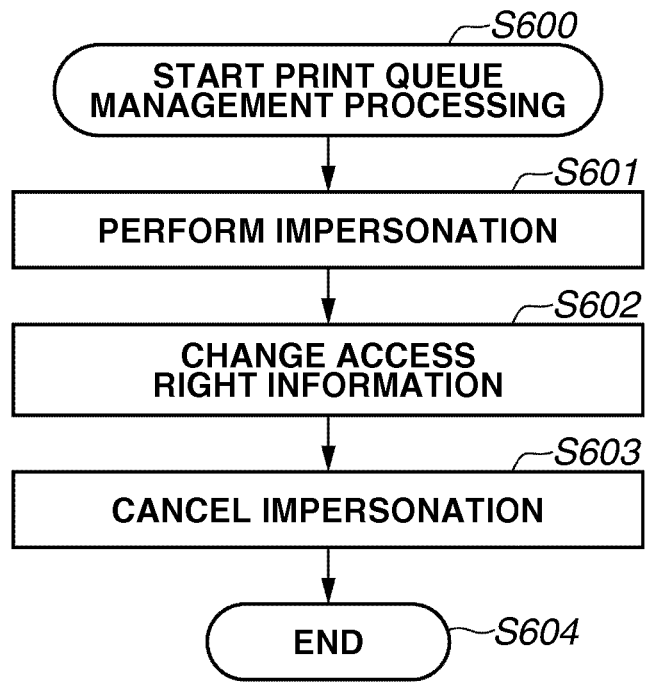

Upon the input via the button 7003, the print queue management processing in operations S600 to S604 illustrated in a flowchart in FIG. 14B is started.

Since the management utility 131 changes the access right information of the print queue which only the special user may access, in operation S601, the impersonation is performed on the special user.

Subsequently, in operation S602, the management utility 131 changes the access right information so that an arbitrary user object may access the print queue.

With reference to an example illustrated in FIG. 8C, the access information of the "Created Printer B" is changed from the "printuser" to the "everyone".

Finally, in operation S603, the management utility 131 cancels the impersonation, and in operation S604, ends the processing.

As described above with reference to FIGS. 13, 14A, and 14B, by the print queue management processing, the user may make visible the invisible print queue, and thus, may flexibly change the method for changing the output destination.

According to the exemplary embodiments, the display of the printer information corresponding to the print queue is controlled to provide users with a printing environment having a high operational efficiency.

Aspects of the embodiments may also be realized by a computer of a system or apparatus (or devices such as a CPU or MPU) that reads out and executes a program recorded on a memory device to perform the functions of the above-described embodiment(s), and by a method, the operations of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). The "processor readable or accessible medium" or "machine/computer readable or accessible medium" may include any medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2011-229135 filed Oct. 18, 2011, which is hereby incorporated by reference herein in its entirety.

What is claimed is:

1. An information processing apparatus comprising:
    a processor; and
    a memory storing instructions that, when executed by the processor, perform operations as:
    a selection unit configured to select a printer corresponding to a printer address as an output destination;
    a generation unit configured to generate a first print queue under a first user authority if there is no print queue having a port address that corresponds to the printer address of the selected printer, the generation unit generating the first print queue by operating a user interface of a virtual printer driver for issuing a printer search instruction and a printer driver installation instruction,
    wherein the generation unit sets access right information for the first print queue as a special access right to a second user authority different from the first user authority, the access right information determining whether to permit or refuse an operation for the first print queue, and
    wherein a printer list program displays a list of print queues including a second print queue which is a print queue of the virtual printer driver but excluding the first print queue if the special access right is set to the first print queue; and an impersonation unit configured to change execution authority from the first user authority to the second user authority if a printing instruction to perform printing is received.

2. The information processing apparatus according to claim 1, further comprising a printing reception unit configured to receive the printing instruction using the printer corresponding to the first print queue based on the special access right.

3. The information processing apparatus according to claim 1, further comprising:
  a reception unit configured to receive an instruction for causing the printer list program to display a print queue; and
  a change unit configured to change the print queue such that, if the reception unit receives the instruction, the printer list program displays the print queue,
  wherein the printer list program displays the print queue changed by the change unit.

4. The information processing apparatus according to claim 1, wherein the special access right is an access right with which users, except for a special user, cannot access the first print queue.

5. A control method comprising:
  selecting a printer corresponding to a printer address as an output destination; generating a first print queue under a first user authority if there is no print queue having a port address that corresponds to the printer address of the selected printer by operating a user interface of a virtual printer driver for issuing a printer search instruction and a printer driver installation instruction,
  wherein generating the first print queue sets access right information for the first print queue as a special access right to a second user authority different from the first user authority, the access right information determining whether to permit or refuse an operation for the first print queue, and
  wherein a printer list program displays a list of print queues including a second print queue which is a print queue of the virtual printer driver but excluding the first print queue if the special access right is set to the first print queue; and
  changing execution authority from the first user authority to the second user authority if a printing instruction to perform printing is received.

6. The control method according to claim 5, further comprising receiving the printing instruction using the printer corresponding to the first print queue based on the special access right.

7. The control method according to claim 5, further comprising:
  receiving an instruction for causing the printer list program to display a print queue; and
  changing the print queue such that, if the instruction is received, the printer list program displays the print queue,
  wherein the printer list program displays the changed print queue.

8. The control method according to claim 5, wherein the special access right is an access right with which users, except for a special user, cannot access the first print queue.

9. A non-transitory storage medium containing instructions that, when executed by a processor, cause the processor to function as:
  a selection unit configured to select a printer corresponding to a printer address as an output destination;
  a generation unit configured to generate a first print queue under a first user authority if there is no print queue having a port address that corresponds to the printer address of the selected printer, the generation unit generating the first print queue by operating a user interface of a virtual printer driver for issuing a printer search instruction and a printer driver installation instruction,
  wherein the generation unit sets access right information for the first print queue as a special access right to a second user authority different from the first user authority, the access right information determining whether to permit or refuse an operation for the first print queue, and
  wherein a printer list program displays a list of print queues including a second print queue which is a print queue of the virtual printer driver but excluding the first print queue if the special access right is set to the first print queue; and
  an impersonation unit configured to change execution authority from the first user authority to the second user authority if a printing instruction to perform printing is received.

10. The storage medium according to claim 9, further causing the computer to function as a printing reception unit configured to receive the printing instruction using the printer corresponding to the first print queue based on the special access right.

11. The storage medium according to claim 9, further causing the computer to function as:
  a reception unit configured to receive an instruction for causing the printer list program to display a print queue; and
  a change unit configured to change the print queue such that, if the reception unit receives the instruction, the printer list program displays the print queue,
  wherein the printer list program displays the print queue changed by the change unit.

12. The storage medium according to claim 9, wherein the special access right is an access right with which users, except for a special user, cannot access the first print queue.

* * * * *